United States Patent [19]

Nagao et al.

[11] 4,435,725
[45] Mar. 6, 1984

[54] COLOR SIGNAL PROCESSING CIRCUIT TO REDUCE CROSS-COLOR DISTURBANCE AND COLOR FRINGING

[75] Inventors: Nobuya Nagao; Teturou Sakai, both of Fukaya, Japan

[73] Assignee: Tokyo Shibaura Denki Kabushiki Kaisha, Kawasaki, Japan

[21] Appl. No.: 310,725

[22] Filed: Oct. 13, 1981

[30] Foreign Application Priority Data

Oct. 16, 1980 [JP] Japan .................. 55-143619

[51] Int. Cl.³ .......................................... H04N 9/535
[52] U.S. Cl. .................................................. 358/36
[58] Field of Search ............... 358/21 R, 36, 31, 166, 358/160, 37, 167

[56] References Cited

U.S. PATENT DOCUMENTS

| | | | |
|---|---|---|---|
| 3,634,615 | 1/1972 | Sasaki | 178/5.4 R |
| 4,223,342 | 9/1980 | Tsuchiya | 358/37 |
| 4,245,237 | 1/1981 | Lagoni | 358/31 |
| 4,268,855 | 5/1981 | Takahashi | 358/36 |
| 4,276,566 | 6/1981 | Parker | 358/36 |
| 4,291,330 | 9/1981 | Hirai | 358/36 |
| 4,355,333 | 10/1982 | Sato | 358/36 |

FOREIGN PATENT DOCUMENTS

| | | |
|---|---|---|
| 2538545 | 5/1978 | Fed. Rep. of Germany . |
| 3138752 | 4/1982 | Fed. Rep. of Germany . |
| 956257 | 4/1964 | United Kingdom . |

*Primary Examiner*—Michael A. Masinick
*Attorney, Agent, or Firm*—Cushman, Darby & Cushman

[57] ABSTRACT

A composite color video signal including a luminance signal and a carrier chrominance signal multiplexed with the luminance signal is separated by a signal separating circuit to the luminance signal and the carrier chrominance signal. The luminance signal is clipped by a clipping circuit at levels approximating to its black and white peak levels and an output signal of the clipping circuit is shaped to control pulses corresponding to level transitions of the output signal by a wave shaping circuit. A signal attenuating circuit for attenuating the carrier chrominance signals or demodulated color signals in response to color pulses applied thereto is connected in a signal transmission path for receiving the carrier chrominance signal from the signal separating circuit to thereby reduce cross-color and color-fringing components caused at level transitions of the luminance signal.

3 Claims, 13 Drawing Figures

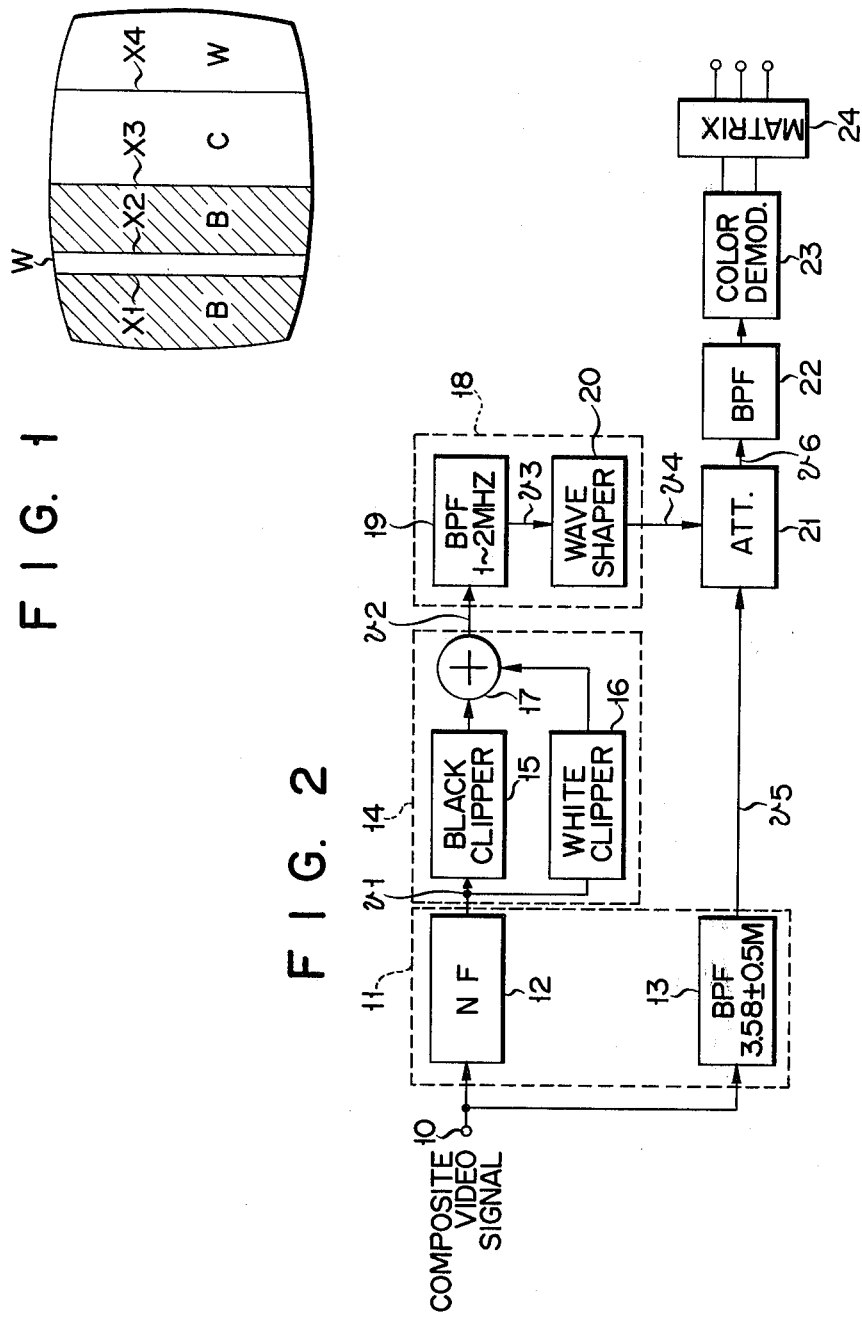

COLOR SIGNAL PROCESSING CIRCUIT TO REDUCE CROSS-COLOR DISTURBANCE AND COLOR FRINGING

BACKGROUND OF THE INVENTION

The present invention relates to a color signal processing circuit for use in color television receivers.

In the present color television systems used in the world, a carrier chrominance signal is multiplexed with a luminance signal to produce a composite color video signal. A color subcarrier frequency is selected to a high frequency (3.58 MHz in the NTSC system) in the frequency band of the luminance signal and the bandwidth of color signals for amplitude-modulating the color subcarrier is considerably narrow as compared with that of the luminance signal.

The composite color video signal is separated in the color television receiver to the carrier chrominance signal and the luminance signal, and the carrier chrominance signal is applied to a color demodulation device where the color signals are recovered from the carrier chrominance signal. The recovered color signals are applied to the color cathode-ray tube. It is well known that cross-color disturbance generates color noises in a color picture when high frequency components of the luminance signal leak into the signal transmission path of the carrier chrominance signal applied to the color demodulation device. As described above, the bandwidth (0 to 500 kHz in the NTSC system) of color signals is considerably narrow as compared with that of luminance signal, and color-fringing components are, therefore, liable to be generated at front and back ends of color signals when produced at broadcasting stations. The color-fringing components are not eliminated at broadcasting stations and modulate, together with pure color signals, the color subcarrier. Accordingly, color-fringing is possibly caused at boundaries of objects in the reproduced picture at the receiving side and appears noticeably at a boundary between colored portion and white portion in the picture.

Cross-color disturbance appears in various forms on the screen. In a picture shown in FIG. 1 and including black, white and color portions B, W and C, for example, cross-color disturbance appears at boundaries X1 and X2 between black portion B and white portion W, boundary X3 between black portion B and colored portion C, and boundary X4 between colored portion C and white portion W. This is because the level of luminance signal changes abruptly at boundaries X1, X2, X3 and X4 and thus high frequency components of luminance signal leak into carrier chrominance signal.

Color-fringing is also caused at boundary X3 between black and color portions B and C and at boundary X4 between color and white portions C and W. This is because the carrier chrominance signal transmitted by broadcasting station already includes the color-fringing components, and the color signals recovered from the carrier chrominance signal cannot fade out abruptly at boundaries X3 and X4 to thereby intrude into black and white portions B and W. Color-fringing is visibly noticeable at the boundary X4 between color and white portions C and W.

SUMMARY OF THE INVENTION

An object of the present invention is to provide an improved color signal processing device capable of reducing cross-color disturbance and color-fringing at transitions of luminance signal to its black or white peak level.

According to the present invention, a signal separating circuit separates a composite color video signal to a carrier chrominance signal and a luminance signal. The luminance signal from the signal separating circuit is clipped by a clipping circuit at levels approximating to its black and white peak levels to generate an output signal which includes level transitions of luminance signal to its black or white peak level. The output signal of the clipping circuit is shaped by a wave shaping circuit to produce control pulses corresponding to the level transitions of the luminance signal. A signal attenuating circuit is provided in a signal transmission path connected to receive the carrier chrominance signal from the signal separating circuit which attenuates an input signal partly in response to application of control pulses thereto to thereby suppress cross-color and color-fringing components.

The signal attenuating circuit may be connected to directly receive the carrier chrominance signal or to receive recovered color video signals from color demodulation circuits.

BRIEF DESCRIPTION OF THE DRAWINGS

FIG. 1 is a view used to explain cross-color disturbance and color-fringing caused in a color picture;

FIG. 2 is a block diagram showing an embodiment of a color signal processing device according to the present invention;

DETAILED DESCRIPTION OF THE PREFERRED EMBODIMENTS

Figure 3A:
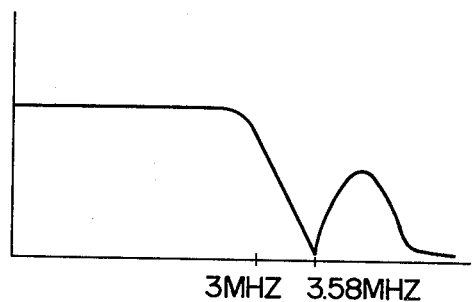
FIGS. 3A to 3C show frequency responses of filters shown in FIG. 2.

A color signal processing circuit according to the present invention will be described in connection with the NTSC system upon referring to the drawings.

Figure 3B:

Referring now to FIG. 2, there is shown a block diagram of a color signal processing circuit according to the present invention. A composite color video signal applied to an input terminal 10 from a video detector stage (not shown) is applied to a signal separating circuit 11 to be separated to a luminance signal Y and a carrier chrominance signal C. The signal separating circuit 11 comprises a notch filter (band elimination filter) 12 having such a frequency response as shown in FIG. 3A to eliminate the carrier chrominance signal and derive the luminance signal component from the composite video signal, and a band-pass filter 13 having a pass-band of 3.58±0.5 MHz shown in FIG. 3B to derive the carrier chrominance signal component from the composite video signal.

The output of low-pass filter 12 is connected to a black and white peak clipping circuit 14 to clip the luminance signal at predetermined levels near the black and white peak levels. The clipping circuit 14 includes a black peak clipper 15, a white peak clipper 16 and an adder circuit 17 for adding together output signals of both clippers 15 and 16.

Figure 3C:
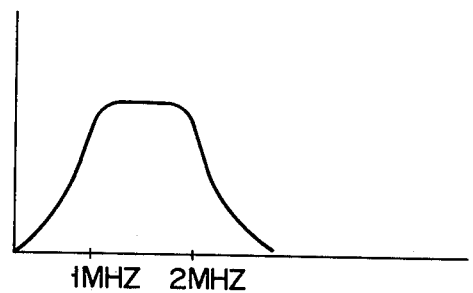

The output of clipping circuit 14 is coupled to a control signal generating circuit 18 which includes a band-pass filter 19 and a wave shaping circuit 20. The band-pass filter 19 has a pass-band of 1 to 2 MHz as shown in FIG. 3C and therefore generates pulses, or differential pulses corresponding to level transitions of output signal of clipping circuit 14. The wave shaping circuit 20 is arranged to shape output pulses of both polarities from band-pass filter 19 to a pulse signal having a single polarity and a uniform magnitude.

The output of band-pass filter 13 for deriving the carrier chrominance signal is connected to a variable attenuator 21, which serves to attenuate the carrier chrominance signal in response to the control pulses from control signal generating circuit 18. The output of variable attenuator 21 is connected via a band-pass filter 22 to a color demodulation circuit 23 where color signals are recovered from the carrier chrominance signal. Color video signals thus recovered are applied to a matrix circuit 24.

Figure 4:
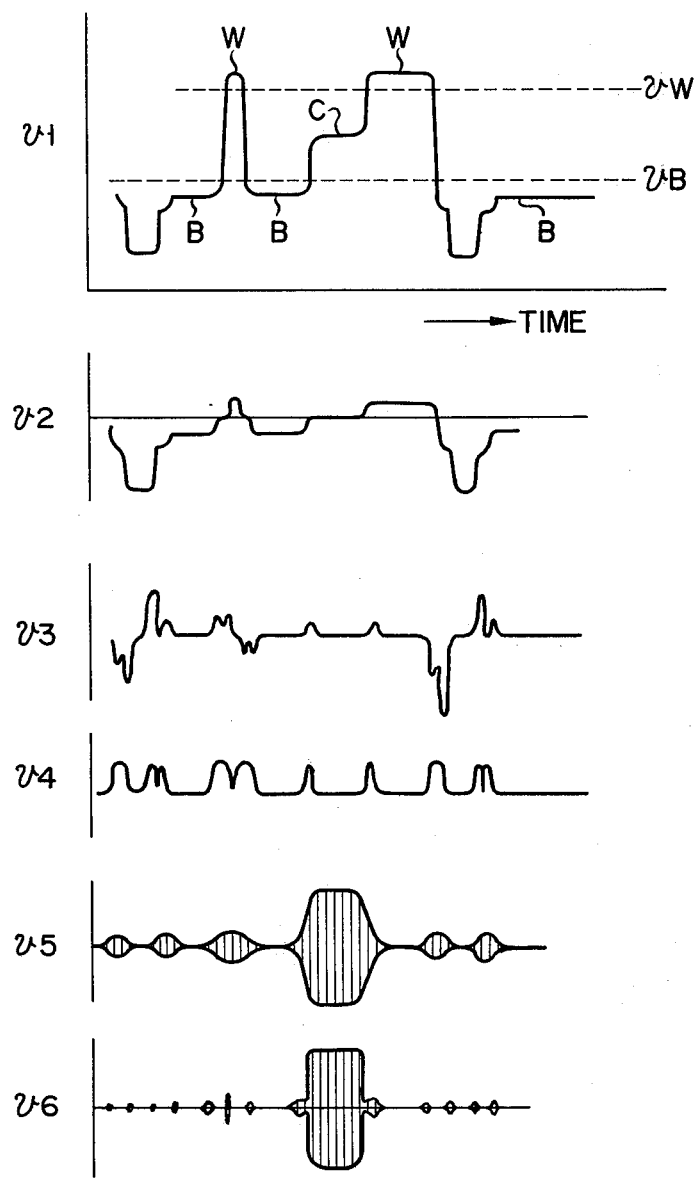
FIG. 4 shows the signal waveforms useful in explaining the operation of the device shown in FIG. 2.

The operation of color signal processing circuit of FIG. 2 will be now described referring to FIG. 4 which shows the waveforms of signals v1 to v6 in the color signal processing circuit.

Signal v1 is the luminance signal from the notch filter 12, which has a waveform corresponding to a picture shown in FIG. 1. Clipping circuit 14 allows only white and black signals to pass therethrough. The white signal is in level higher than a predetermined level $V_W$ near the white peak level and the black signal including synchronizing signals is in level lower than a predetermined level $V_B$ near the black peak level. It is therefore apparent that an output signal v2 shown in FIG. 4 is taken from the clipping circuit 14.

When output signal v2 of clipping circuit 14 is applied to band-pass filter 19, an output signal v3 which includes positive and negative-going pulses corresponding to positive and negative transitions of the output signal v2 is generated as shown in FIG. 4. The wave shaper 20 is arranged to shape pulses in the output signal v3 of band-pass filter 19 so as to generate an output signal v4 whose pulses are unidirectional and have a uniform amplitude, as shown in FIG. 4. Each pulse of this output signal v4 is applied to variable attenuator circuit 21 to attenuate the carrier chrominance signal applied to the variable attenuator circuit 21 from the band-pass filter 13.

The output signal v5 of band-pass filter 13 includes, as shown in FIG. 4, cross-color components at those portions where large changes are caused in the level of luminance signal. Carrier chrominance signal component contained in output signal v5 to reproduce color portion C on the screen of FIG. 1 does not change abruptly at both ends of its envelope corresponding to boundaries X3 and X4 of picture and therefore have certain transition periods. The chrominance signal in these transition periods causes color fringing. This is because color video signals are limited, at transmission side, to a frequency band considerably narrower than that of luminance signal.

The output pulses in the output signal v4 of control signal generating circuit 18 each are generated during a period that a cross-color component or a color-fringing component exists in the carrier chrominance signal v5. Therefore, cross-color and color-fringing components are suppressed by the variable attenuator 21, thus allowing an output signal v6 to be taken as shown in FIG. 4. This output signal v6 is applied to color demodulator 23 so that a picture of high quality is reproduced.

The reason why the output signal v6 of variable attenuator 21 is applied via band-pass filter 22 to color demodulator 23 is to prevent changes in direct-current level of the output signal v6, which may be possibly caused depending upon variable attenuator 21, from adversely affecting color demodulator 23.

Figure 5:
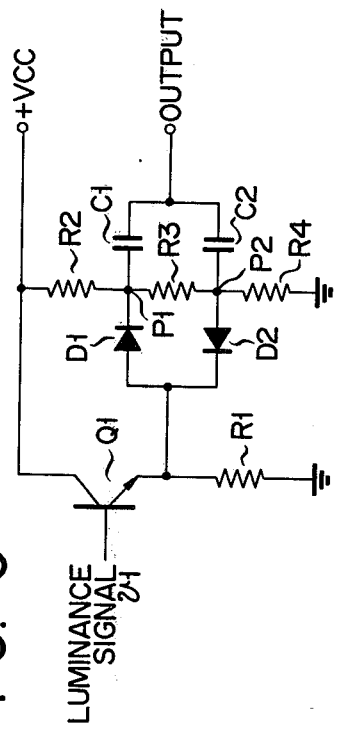
FIG. 5 shows a practical circuit arrangement of a clipping circuit shown in FIG. 2.

FIG. 5 shows a practical circuit arrangement of a clipping circuit 14. The luminance signal v1 from band-pass filter 12 is applied to the base of a transistor Q1 having its collector connected to a power source +Vcc and its emitter grounded through a resistor R1. Resistors R2, R3 and R4 are connected in series between the power source +Vcc and ground. A clipping diode D1 has its anode connected to the emitter of transistor Q1 and its cathode connected to a connection point P1 between resistors R2 and R3. Another clipping diode D2 has its cathode connected to the emitter of transistor Q1 and its anode connected to a connection point P2 between resistors R3 and R4. Connection points P1 and P2 are connected via capacitors C1 and C2 to a common output, respectively.

Figure 6:
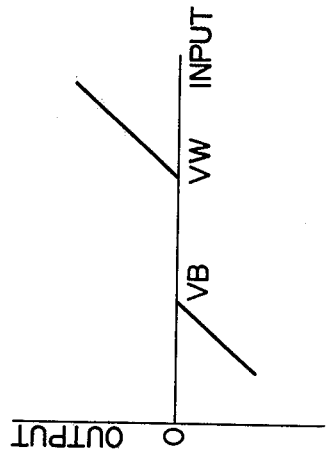
FIG. 6 shows the transfer characteristic of a clipping circuit shown in FIG. 5.

The circuit thus arranged has such transfer characteristic as shown in FIG. 6 and its positive break point is determined by a potential at connection point P1 between resistors R2 and R3 while its negative break point by a potential at connection point P2 between resistors R3 and R4. Therefore, when the potential at connection point P1 is set to $V_W$ and the potential at connection point P2 to $V_B$, the signal v2 is produced from the signal v1 as shown in FIG. 4.

Figure 8:
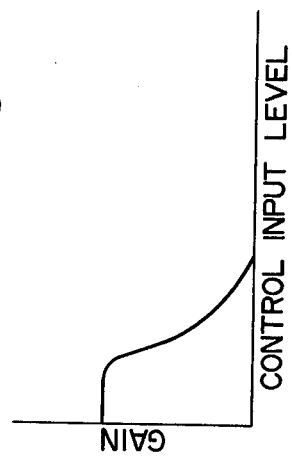
FIG. 8 shows the control input level versus gain characteristic of the circuit shown in FIG. 7.
Figure 7:
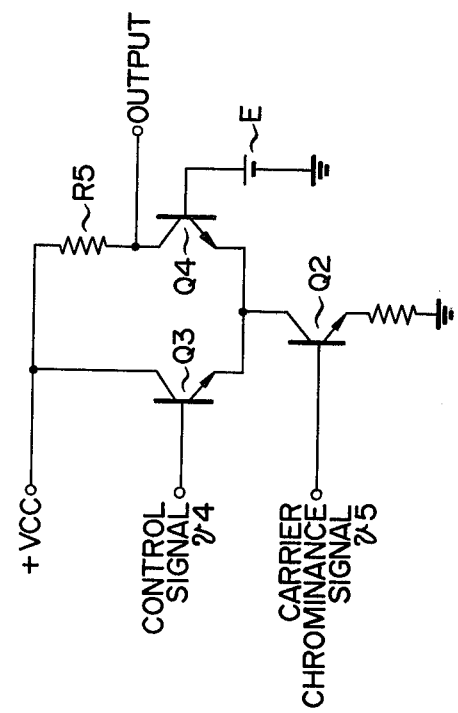
FIG. 7 shows a practical arrangement of a signal attenuator shown in FIG. 2.

FIG. 7 shows a practical circuit arrangement of variable attenuator circuit 21. This circuit has a control input level versus gain characteristic as shown in FIG. 8. The carrier chrominance signal v5 is applied to the base of a transistor Q2 having its collector connected to emitters of differential transistors Q3 and Q4. Transistor Q3 is connected to receive the control signal v4 at its base and transistor Q4 is connected at its base to a source of bias voltage E1. The output signal v6 is taken out of a connection point between the collector of transistor Q4 and a load resistor R5.

The gain of this circuit is controlled by the pulse voltage of control signal v4. Namely, when the pulse voltage is higher than the base bias voltage E1 of transistor Q4, the transistor Q3 is turned ON and the transistor Q4 is turned OFF. As a result, the gain of this circuit is reduced to zero during the time when each pulse is applied to the base of transistor Q3.

Figure 9:
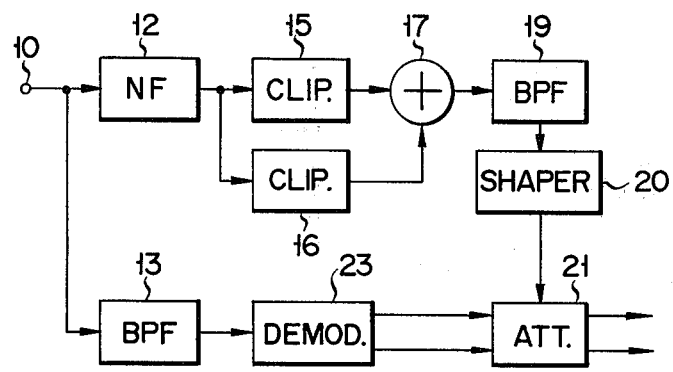
FIG. 9 shows another embodiment of a color signal processing device according to the present invention.

FIG. 9 shows another embodiment according to the present invention and same reference numerals are used to designate the same parts as those of the embodiment shown in FIG. 2. In the case of this embodiment, variable attenuator 21 is connected at the output side of color demodulation circuit 23 and a circuit as shown in FIG. 7 is provided for each of the plural outputs of color modulation circuit. With this embodiment, the demodulated color signals are controlled to attenuate cross-color and color-fringing components.

Figure 10:
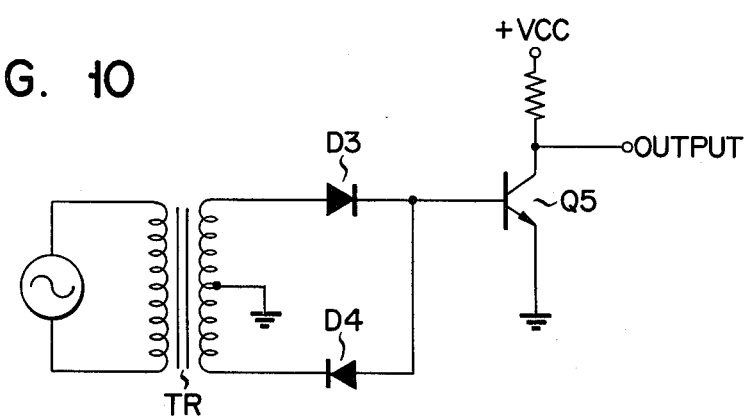
FIGS. 10 and 11 show other practical circuit arrangements of the clipping circuit.

FIG. 10 shows another example of a clipping circuit. This clipping circuit employs a transformer TR to couple the luminance signal to clipping diodes D3 and D4. The output signals of clipping diodes D3 and D4 are applied to the base of a transistor Q5. Break points of the circuit are determined by biasing diodes D3 and D4 to predetermined values, respectively.

Figure 11:
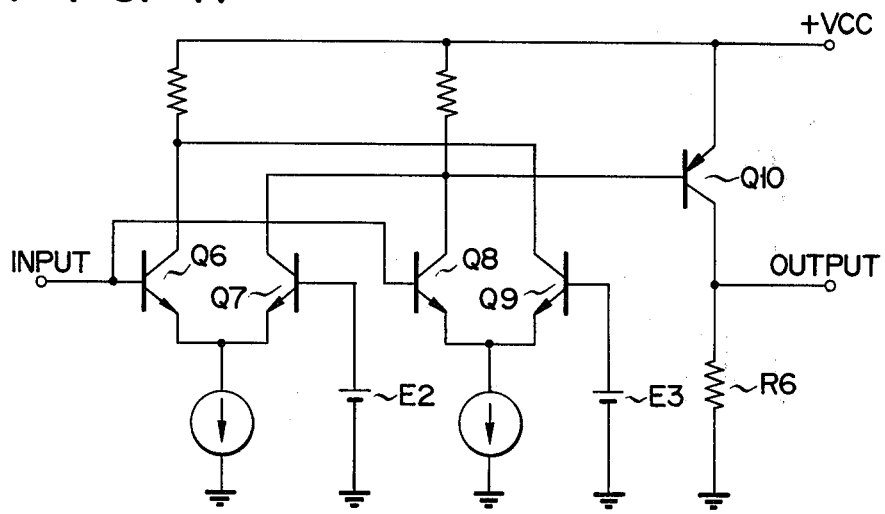

FIG. 11 shows a further example of a clipping circuit which includes differential transistor pairs of transistors Q6, Q7 and Q8, Q9. The luminance signal is applied to the bases of transistors Q6 and Q8 and the bases of transistors Q7 and Q9 are connected to bias voltage sources E2 and E3 which set break points of the circuit to $V_B$ and $V_W$, respectively. The collectors of transistors Q7 and Q8 are connected together to the base of an output transistor Q10 having its emitter connected to the power source +Vcc and its collector earthed through a resistor R6. In this circuit, a white signal above the clipping level $V_W$ appears at the collector of transistor Q8. On the other hand, a black signal below the clipping level $V_B$ appears at the collector of transistor Q7. The clipped white and black signals are taken from the collector of output transistor Q10.

It should be understood that the present invention is not limited to the color signal processing device for processing the composite video signal according to the NTSC system, but can be applied to the process of a composite signal according to other color television systems in which a carrier chrominance signal is multiplexed with a luminance signal.

What we claim is:

1. A color signal processing circuit comprising:
   a signal separating circuit means for separating a composite video signal including a luminance signal and a carrier chrominance signal multiplexed with the luminance signal to the carrier chrominance signal and the luminance signal;
   a clipping circuit means coupled to receive the luminance signal from said signal separating circuit means for clipping the luminance signal at levels near its black and white peak levels to produce a signal containing level transitions indicative of large luminance signal transitions;
   a control pulse generating circuit means coupled to said clipping circuit means for generating control pulses corresponding to said level transitions;
   a signal transmission path coupled to receive the carrier chrominance signal from said signal separating circuit means, and including a signal attenuating circuit means for attenuating the carrier chrominance signal applied thereto in response to application of control pulses from said control pulse generating circuit means.

2. A color signal processing circuit according to claim 1 wherein said signal attenuating circuit means is coupled to receive output signals of a color demodulation circuit which demodulates the carrier chrominance signal.

3. A color signal processing circuit according to claim 1 further including a circuit means coupled to the output of said signal attenuating circuit means for eliminating changes in direct-current level of output signal of said signal attenuating circuit means.

* * * * *